United States Patent [19]

Wang et al.

[11] Patent Number: 5,157,831

[45] Date of Patent: Oct. 27, 1992

[54] PROCESS FOR PREPARING AN HERMETICALLY SEALED GLASS-METAL ELECTRICAL CONNECTOR

[75] Inventors: Xingwu Wang; Jun Lou, Alfred, both of N.Y.

[73] Assignees: Alfred University, Alfred; Howard J. Greenwald, Rochester, both of N.Y.

[21] Appl. No.: 811,259

[22] Filed: Dec. 20, 1991

[51] Int. Cl.⁵ ............................................. H01R 43/20
[52] U.S. Cl. ........................................ 29/876; 29/832; 65/36; 174/50.61
[58] Field of Search .................... 29/876, 832; 65/36, 65/43; 174/50, 61

[56] References Cited

U.S. PATENT DOCUMENTS

| | | | |
|---|---|---|---|
| 2,950,574 | 8/1960 | Slater et al. | 29/876 |
| 3,370,874 | 2/1968 | Schever et al. | 174/50.61 X |
| 3,389,215 | 6/1968 | Rice et al. | 174/50.61 X |
| 3,522,489 | 8/1970 | Sparrow et al. | 174/50.61 X |
| 3,639,675 | 2/1972 | Kaino | 65/36 X |
| 3,982,918 | 9/1976 | Frieser et al. | 65/36 X |
| 4,136,442 | 1/1979 | Harnett | 29/876 |
| 4,411,680 | 10/1983 | Kyle | 65/36 X |
| 4,492,814 | 1/1985 | Snell et al. | 174/50.61 X |
| 4,493,944 | 1/1985 | Snell et al. | 174/50.61 X |
| 4,521,641 | 6/1985 | Snell et al. | 174/50.61 X |
| 5,104,755 | 4/1992 | Taylor et al. | 174/50.61 X |

*Primary Examiner*—Carl J. Arbes
*Attorney, Agent, or Firm*—Howard J. Greenwald

[57] ABSTRACT

A process for preparing an electrical connector from a glass plug, a rigid metal shell, and at least one pin conductor is disclosed.

The glass plug is made by mixing glass powder with binder, forming a green body, debindering the green body, and heating the debindered green body.

The metal shell and metal pin conductor(s) are first cleaned by heating them in a hydrogen-containing atmosphere, and thereafter forming an oxide coating on their surfaces.

An assembly is then formed from the rigid metal shell, the glass plug, and the pin conductor(s). This assembly is then heat treated to form the electrical connector.

20 Claims, 2 Drawing Sheets

PROCESS FOR PREPARING AN HERMETICALLY SEALED GLASS-METAL ELECTRICAL CONNECTOR

FIELD OF THE INVENTION

A process for preparing hermetically sealed glass-metal electrical connectors in which glass powder is heat-treated and bonded to a metal case and metal pins is disclosed.

BACKGROUND OF THE INVENTION

Articles containing glass-to-metal seals are well known to those skilled in the art; and the problems caused by stresses in such seals are also well known. Thus, for example, in an article published by Arun K. Varshneya in the Journal of the American Ceramic Society (Volume 63, Number 5-6, pages 311-315, 1980), it is disclosed (at page 311 that ". . . stresses in glass-to-metal seals develop as a result of the difference in thermal contraction of the two components from the point of sealing down to a lower temperature. Seals are likely to fail if tensile stresses reaching the breaking strength are generated in glass. Although the science of stress calculations in glass-to-metal seals introduced by Hull and Burger . . . several years ago is still the most valuable guide, glass-to-metal sealing is still treated mostly as an 'art.' One of the factors contributing to the empiricism is the relatively poor understanding of the rheological properties of glass."

Seals between metal and glass are especially important in articles in which hermeticity or thermal stability is required; such hermeticity and/or thermal stability is often required in electrical connectors.

Electrical connectors are widely sold by many different vendors. A "working temperature" and a "working pressure" is usually specified for the connector. Thus, by way of illustration, at page 20 of the Kemlon "Multipin Feedthru Electrical Connectors" catalog (published in 1989 by Kemlon Products & Development, 6310 Sidney, Houston, Tex.), a "KEMLON PMJ 304 S.S. BODY" connector is described. This connector has a working temperature of from minus 60 to 200 degrees centigrade and a working pressure of from 0 to 20,000 pounds per square inch. In this case, the low-temperature limit for the connector renders it unsuitable for many uses.

It is an object of this invention to provide a process for the preparation of articles containing glass-to-metal seals which will increase the working temperature range of such articles.

It is another object of this invention to provide a process for the preparation of articles containing glass-to-metal seals which will increase the working pressure range of such articles.

SUMMARY OF THE INVENTION

In accordance with this invention, there is provided a process for preparing a glass-to-metal seal in which metal material is heated to a temperature of from about 800 to about 1,300 degrees Centigrade while under protective atmosphere. Thereafter, the metal material is heated to a temperature of from about 600 to about 1,000 degrees Centigrade while being contacted with oxidizing environment to form an oxidized layer on its surface. The partially oxidized metal material is then contacted with molten glass.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

The process of this invention may be advantageously used to prepare electrical connectors which, preferably, are hermetically sealed. These type of electrical connectors are well known to those skilled in the art and are described, e.g., in U.S. Pat. Nos. 4,690,482 of Chamberland et al., 4,737,601 of Gartzke, and 4,720,271 of Grange; the disclosure of each of these patents is hereby incorporated by reference into this specification.

The electrical connectors may have one pin, or many pins, for conducting electricity. By way of illustration, one-pin connectors are illustrated in a catalog entitled "Glass Sealed Feedthrus Electrical Connectors" which was published by the Kemlon Products & Development Company (as TWX 910-881-1592) in 1982. By way of further illustration, the electrical connectors disclosed in the aforementioned Kemlon "Multipin Feedthru Electrical Connectors" catalog are constructed of 304 stainless steel, Inconel 600, or Inconel X-750 bodies and 52 percent nickel alloy or Kovar pins.

Figures 1A, 1B:
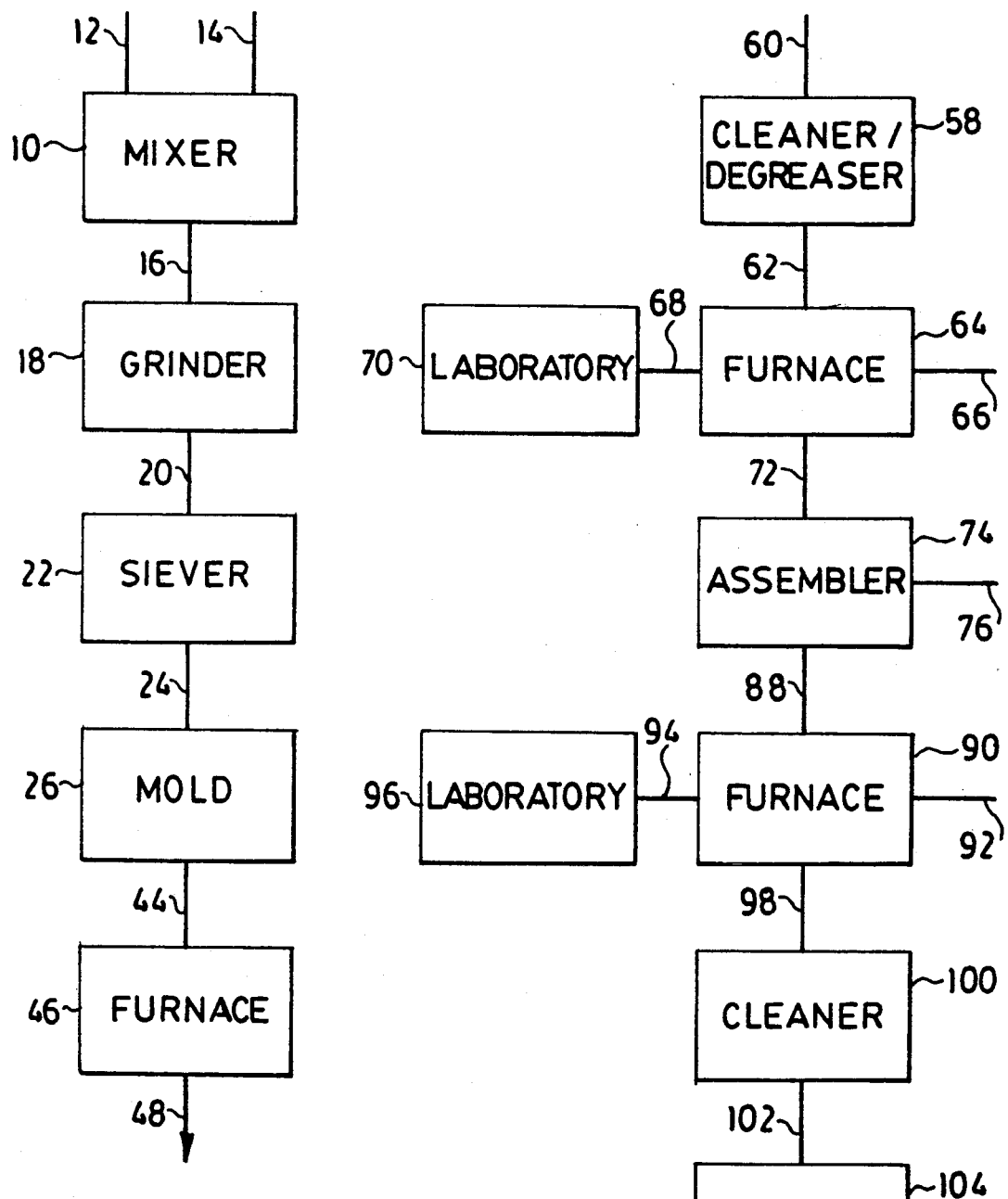
FIGS. 1A and 1B collectively comprise a flow diagram illustrating one preferred process of applicants' invention.

FIG. 1 illustrates one preferred embodiment of applicant's process. Referring to FIG. 1, it will be seen that the a glass plug (not shown) is preferably simultaneously prepared along with one or more metallic conductors (not shown) and a metallic case (not shown).

To mixer 10 is charged glass powder via line 12 and wax via line 14. In general, from about 5 to about 15 parts of the wax are charged to mixer 10 for each 100 parts of the total mixture.

It is preferred that substantially all of the particles of the glass powder have a particle size of from about 10 to about 300 microns. In an even more preferred embodiment, the particle size of substantially all of the glass particles is from about 70 to about 80 microns.

One may use the powdered glasses sold by the Corning, Inc. of Corning, N.Y. Thus, referring to Corning catalog MG-EG-90 ("Specialty Glass and Glass Ceramic Materials", published by Corning, Inc. in 1990), one may use powdered glasses numbers 0080, 0120, 0139, 0221, 1723, 1724, 7046, 7050, 7052, 7056, 7059, 7070, 7720, 7740, 7761, 7913, 7930, 7940, 8870, 9010, 9013, 9741, and the like.

When determining which glass powder to use in applicants' process, consideration must be given to the coefficients of thermal expansion for both the glass and each of the metallic conductor(s) and the enclosure.

As is known to those skilled in the art, the coefficient of thermal expansion of a material is the increase in volume per unit volume per degree change in temperature; see, e.g., A.S.T.M. Standard Tests D117 and D-27. The coefficient of thermal expansion is commonly stated as the average coefficient over a given temperature range.

In the process of this invention, it is preferred that the coefficient of thermal expansion of the glass material be either greater than or equal to the coefficient of thermal expansion of the metallic material comprising the conductor(s). It is also preferred that the coefficient of thermal expansion of the glass should be smaller than or equal to that of the coefficient of thermal expansion of the metallic case.

In one embodiment, which is often referred to as a "matched seal," the coefficients of thermal expansion of the glass material, the conductor(s) material, and the case material are substantially identical, being from about 0.9 to about 1.1 times as great as each other and, preferably, from about 0.95 to about 1.05 times as great as each other.

In another embodiment, referred to as "unmatched seals," the coefficient of thermal expansion of the case is greater than that of the glass, which in turn is greater than that of the conductor(s). This embodiment is especially preferred in situations requiring the connector to withstand high pressure.

By way of illustration, when both the case material and the conductor material are "KOVAR" (an alloy, also sold under the name of "COVAR," which consists essentially of iron, nickel, and cobalt and which has a coefficient of thermal expansion of $47 \times 10^{-7}$ centimeter/centimeter/degree centigrade), then one may produced a "matched seal" by using Corning glass 7052, which also has a coefficient of thermal expansion of $47 \times 10^{-7}$ centimeter/centimeter/degree centigrade.

Thus, by way of further illustration, where the case material is titanium (with a coefficient of thermal expansion of $88 \times 10^{-7}$ centimeter/centimeter/degree centigrade) and the conductor material is also titanium, then one can use Corning glass numbers 7570, 0120, 8161, or 9010 to provide a substantially matched seal.

By way of further illustration, where the case material is stainless steel (with a coefficient of thermal expansion of about $140 \times 10^{-7}$ centimeter/centimeter/degree centigrade), and the conductors are made of Kovar, then one may use a glass with a coefficient of thermal expansion between about 140 and 47 such as, e.g., Corning glasses 7580, 7583, 7576, and the like Referring again to FIG. 1, the wax charged via line 14 is a binder which, after being mixed with the glass powder, will allow the mixture thus formed to be shaped into a body with a reasonable amount of structural integrity. Any binder which serves this purpose and which, after being burned out of a green body, does not contaminate the glass, may be used in the process. It is preferred to use waxes, such as paraffin derived from petroleum, candelalla and carbnuba waxes derived from plants, and beeswax of insect origin.

In one preferred embodiment, the wax used has a melting point of from about 50 to about 60 degrees Centigrade.

Referring again to FIG. 1, the mixture in mixer 10 is mixed until it is substantially homogeneous. Thereafter, it may be discharged via line 16 to grinder 18, in which the size of the mixture's particles may be adjusted.

In grinder 18, the mixture from mixer 10 is ground until substantially all of the particles are from about 150 to about 425 microns in size. The ground mixture from grinder 18 is then passed via line 20 to siever 22. Thereafter, the particles which are from 150 to about 425 microns in size are passed via line 24 to mold 26, in which it is shaped into the form of a glass plug 28 (see FIG. 2).

Figure 2A:
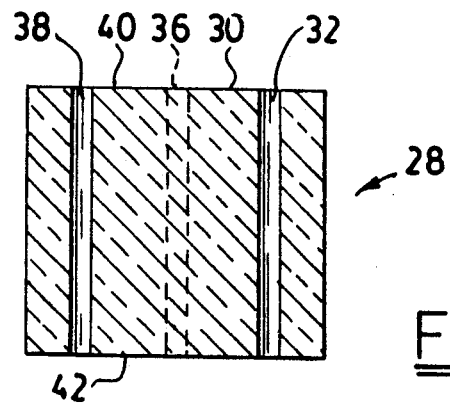
FIGS. 2A and 2B are respectively the side and top views of a mold which may be used to form a glass structure which, in turn, can be used to produce the electrical connector of this invention.
Figure 2B:
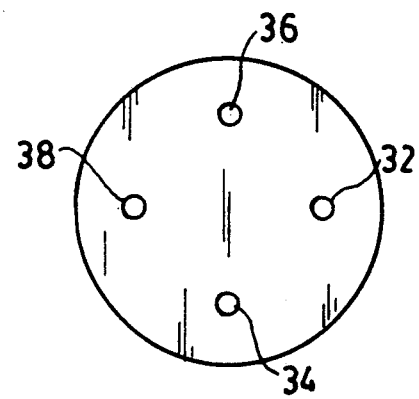

Referring to FIG. 2, it will be seen that the mixture of glass and wax 30, when poured and compacted into mold 26, will form glass plug 28 of the desired shape with one or more orifices adapted to receive the conductor(s), not shown, of the connector.

In the embodiment illustrated in FIG. 2, the mold 26 forms four orifices 32, 34, 36 and 38 in glass plug 28. It will be appreciated that, depending upon the number of conductors to be used in the connector, the number of orifices formed in the mold may be smaller or greater. In one embodiment, only one pin conductor is used, and only one such orifice is required. One will have from about 1 to about 30 of such pin conductors and a corresponding number of orifices.

Again referring to FIG. 2, in the embodiment illustrated in the Figure the plug 28 has a substantially cylindrical cross-section. It will be appreciated by those skilled in the art that, depending upon the configuration of the desired electrical connector, other cross-sectional shapes may be used such as elliptical cross-sections, irregular cross-sections, and the like. It is preferred, however, to use a substantially circular cross-section.

In the embodiment of FIG. 2, the orifices each have substantially the same size and shape. It will be apparent that they may have different sizes and/or shapes.

In the embodiment illustrated in FIG. 2, the width of the top 40 of plug 28 is substantially equal to the width of the bottom 42 of plug 28. In another embodiment, not shown, the width of the top 40 is greater than the width of the bottom 42; this embodiment allows the plug 28 to withstand a pressure differential wherein substantially more pressure is applied to top 40 than bottom 42.

Depending upon the electrical characteristics desired in the connector, one should choose suitable materials, configurations, and dimensions to optimize the use of the connector.

Referring again to FIG. 1, after the green body 28 has been formed in mold 26, it is passed via line to furnace 46, in which the binder/wax is depleted.

The green body may be heated in furnace 46 to a temperature greater than the melting temperature of the wax/binder but substantially less than the softening temperature of the glass. It is essential to remove substantially all of the wax from the green body.

By way of illustration, the green body may be heated in furnace 46 to a temperature of from about 300 to about 400 degrees Centigrade for from about 5 to about 12 hours. In this embodiment, it is preferred to heat the green body to a temperature of from about 390 to about 400 degrees Centigrade for from about 8 to about 10 hours.

By way of further illustration, one may first heat the green body in furnace 46 from ambient temperature up to a temperature of from about 450 to 580 degrees Centigrade at rate of from about 5 to about 10 degrees Centigrade per minute, thereafter maintain the green body at such temperature for from about 5 to about 10 hours.

The aforementioned dewaxing treatments are merely illustrative, and other means may be used which result in the removal of at least 95 weight percent of the wax from the green body.

After at least about 95 weight percent of the wax has been removed from the green body, the green body is then heat treated by being subjected to a temperature of from about 300 to about 1,000 degrees Centigrade, provided that such temperature is lower than the softening temperature of the glass. In one embodiment, such temperature is from about 500 to about 750 degrees Centigrade. In an even more preferred embodiment, such temperature is from about 550 to about 600 degrees Centigrade. The temperature of the green body is raised at a rate of from about 5 to about 10 degrees Centigrade per minute. Once the desired heat-treatment temperature is reached, the green body is then maintained at this temperature for about 10 to about 60 minutes and, preferably, for from about 10 to about 30 minutes.

This heat treatment produces a free-standing glass plug 28 with more structural integrity. The glass plug 28 may then be discharged via line 48.

Figure 3:
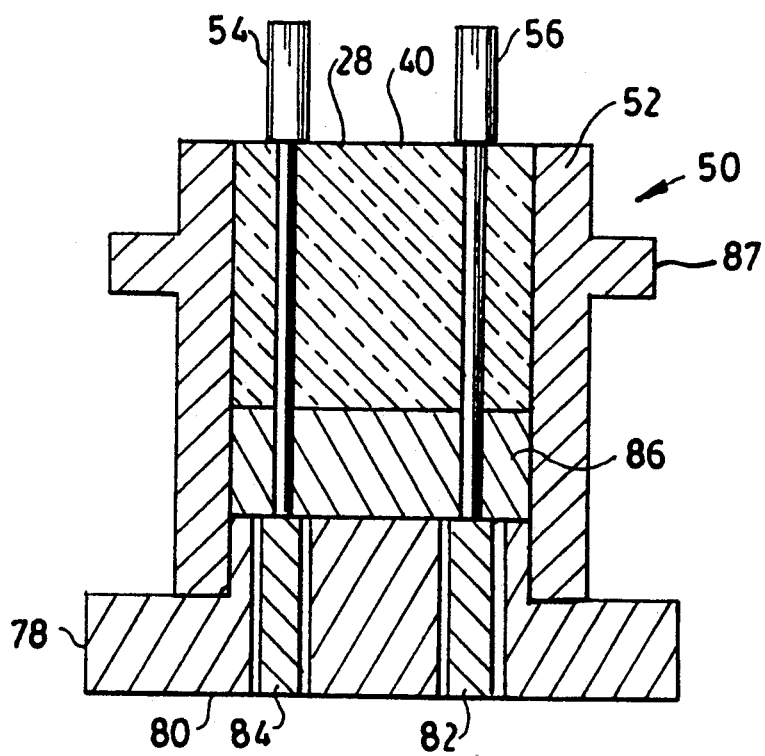
FIG. 3 is a sectional view of a mold which may be used to assembly the glass structure of FIG. 2, connector pins, and a metal enclosure into the electrical connector of this invention.

Referring to FIG. 3, it will be seen that connector 50 is comprised of the aforementioned glass plug 28, a metallic case 52 and, in the embodiment illustrated in FIG. 3, metallic conductors 54 and 56. Prior to the time that metallic case 52 and/or metallic conductors 54 and 56 may be bonded to glass plug 28, they must be subjected to a specified pretreatment.

Referring again to FIG. 1, it will be appreciated that metallic case 52 and metallic conductor(s) 54 and 56 may be treated separately or together. For the purposes of economy, however, it is preferred to treat them together; and this embodiment is illustrated in FIG. 1.

To cleaner/degreaser is preferably charged the metallic parts (the metallic case 52, and the metallic conductors 54 and 56) via line 60. The metallic parts are treated in this device, by the use of conventional means and chemicals, to remove organic greases and/or contaminants from the surfaces of the metallic parts. Any of the conventional cleaners and/or degreasers may be used such as, e.g., alcohol, acetone, methanol, trichloroethylene, and the like. The cleaning may be effected or facilitated by ultrasonic means, by mechanical means, manually, and the like.

The cleaned metallic parts are then preferably passed via line 62 to furnace Then furnace is purged of air and oxygen-containing gas by being flushed with an inert gas, such as argon. The argon may be introduced via line 66. Once the oxygen-containing gas has been flushed from the system, a hydrogen-containing gas is introduced into furnace 64 via line 66.

It is preferred that the hydrogen-containing gas be hydrogen which, optionally, may be mixed with water. In one embodiment, illustrated in U.S. Pat. No. 5,004,489 of Retman et al., gas introduced via line 66 contains from about 10 to 99 percent of hydrogen and from about 1 to about 8 percent of water vapor, with the ratio of hydrogen/water vapor being at least about 5; the disclosure of this United States patent is hereby incorporated by reference into this specification.

In another embodiment, the gas introduced via line 66 consists essentially of dry hydrogen gas which is comprised of less than 1.0 weight percent of water.

Once the hydrogen-containing gas in the furnace blankets the metallic parts, the temperature of the furnace is raised from 800 to about 1,300 Degrees Centigrade. Once the metallic parts have reached this temperature, they are maintained thereat for form about at least about 30 minutes and, preferably, from about 0.5 hours to about 3.0 hours.

In one preferred embodiment, the metallic parts are subjected to a temperature of from about 900 to about 1,100 degrees Centigrade for from 0.5 to about 1.5 hours, while being contacted with hydrogen-containing gas flowing at a rate of from about 1 to about 20 liters per minute. It is preferred that the metallic parts be contacted with hydrogen-containing gas flowing at a rate of from about 5 to about 10 liters per minute.

In one preferred embodiment, the metallic parts are first charged into a container (not shown) which consists essentially of nickel, and this nickel container/metallic parts assembly is then charged into the furnace 64. Thereafter, the assembly is covered with hydrogen-containing gas and heated as described above.

The function of the treatment with the hydrogen-containing gas is to remove any impurities on or near the surfaces of the metal parts which were not already removed by the cleaner/degreaser, such as carbon. This treatment is often referred to as "decarburization."

Once the surfaces of the metallic parts have been sufficiently decarburized, the metallic parts are then heated in the presence of an oxidizing environment. This heating can be conducted in the same furnace (such as furnace 64), or in another furnace. In the embodiment illustrated in FIG. 1, the same furnace is used.

Referring again to FIG. 1, after the decarburization, an oxygen-containing gas is introduced via line 66 into furnace 64. One may use any suitable oxygen-containing gas such as air, oxygen, ozone, and the like. It is preferred to flush the hydrogen-containing gas from the system and to flow the oxygen-containing gas into the furnace at a flow rate of from about 1 to about 20 liters per minute.

Once the metallic parts are contacted by the oxygen-containing gas, they are heated to a temperature of from about 600 to about 1,000 degrees Centigrade for at least about 5 minutes and, preferably, for from about 5 minutes to about 2 hours to form an oxidized layer on the surfaces of the metallic parts. The oxidation is conducted until an oxidized metallic layer with a thickness of from about 0.5 to about 3.0 microns is formed on the metallic parts. In one preferred embodiment, the heating is conducted until an oxidized metallic layer with a thickness of from about 0.75 to about 1.25 microns is formed.

During the oxidation process, samples may be periodically removed from furnace 64 via line 68 to laboratory 70, wherein the effect of the oxidation may be examined by conventional analytical means such as, e.g., scanning electron microscopy. Alternatively, other means of examining the thickness of the oxidized layer may be used such as, e.g., by using a mechanical surface profile meter.

In one embodiment, not shown, the metallic parts are oxidized by other means such as, for example, heating them within furnace 64 and then withdrawing them from the furnace, etc.

The oxidized metal parts are preferably allowed to cool to ambient temperature. They may be allowed to cool within furnace 64. Alternatively, or additionally, they may be removed from furnace 64 and cooled.

The cooled oxidized parts are then passed via line 72 to assembler 74. The glass plug 28 (which was prepared in furnace 46) is then passed via line 76 to assembler 74.

Referring to FIG. 3, it will be appreciated that, in assembler 74, a graphite mold 78 is provided. This mold 78 is comprised of a base 80, upstanding conductive pin supports 82 and 84, and glass plug support 86.

Metallic case 52 is preferably first slid over graphite mold 78 until it contacts the base 80 thereof. Thereafter, it is preferred to slide glass plug 28 within the metallic case 52 until it contacts the glass plug support 86. Thereafter, conductive pins 54 and 56 are preferably inserted in the appropriate orifices of the glass plug (see FIG. 2) until they contact pin supports 82 and 84.

Once the assembly depicted in FIG. 3 has been constructed, (and has become assembly 87), it is then passed via line 88 to furnace 90.

It is preferred to preheat furnace 90 to a temperature of from about 750 to about 1,500 degrees Centigrade and, more preferably, to a temperature of from about 900 to about 1,100 degrees Centigrade. Simultaneously, or sequentially, the furnace 90 is preferably filled with inert gas introduced via line 92. The inert gas may be nitrogen, argon, krypton, mixtures thereof, and the like.

The assembly 87 from assembler 74 is preferably introduced into furnace 90 after it has been so preheated. In one preferred embodiment, not shown, assembly 87 is first placed into a graphite container prior to being inserted into preheated furnace 90.

Once assembly 87 has been inserted into furnace 90, it is heated at said temperature of from about 750 to about 1,500 degrees for at least about 5 minutes and, preferably, for from about 5 to about 120 minutes, until the glass-metal seals have been formed. Samples of material may be periodically removed from furnace 90 via line 94 and studied in laboratory 96 to evaluate the degree of sealing. Conventional analytical means, such as scanning electron microscopy, may be used.

After the glass-metal bond has been suitably formed, the assembly 87 is then cooled to ambient. Thereafter, the connector thus formed is removed from mold 78. This connector is then reintroduced into furnace 90, where it is annealed.

In one preferred embodiment, the connector is first placed into a nickel container prior to the time it is annealed in furnace 90.

It is preferred to anneal the connector by first raising its temperature from ambient to a temperature of from about 350 to about 700 degrees centigrade at a rate of from about 0.5 to about 5.0 degrees centigrade per minute. It is more preferred to raise the temperature of the connector body from ambient to a temperature of from about 400 to about 600 at a rate of from about 1 to about 2 degrees centigrade per minute.

Once the connector body has been raised to a temperature of from about 350 to about 700 degrees centigrade, it is maintained at this temperature for at least about 0.5 hours and, preferably, for from about 0.5 to about 3.0 hours. Thereafter, the connector body is cooled to ambient.

The cooled connector body then may be passed via line 98 to cleaner 100, wherein its exterior surfaces may be cleaned by conventional means such as ultrasonic waves, dilute hydrofluoric acid, and the like. After the connector body has been cleaned, it may be rinsed with deionized or distilled water.

The cleaned connector from cleaner 100 may be passed via line 102 to plater 104, in which a metal coating may be formed on the metal parts of the connector. The coating generally is from 0.5 to about 5.0 microns thick, and the coating often is comprised of gold, or silver, or aluminum, or nickel, or cadmium, and the like.

The electrical connectors produced by the process of this invention generally have superior properties.

The connectors of this invention qualify as high voltage insulators when tested by NEMA (National Electrical Manufacturers Association) Standard HV-1-1973, "High-Voltage Insulators." Thus, for example, when a direct current voltage of 2 kilovolts is applied between pin 54 and case 52 (see FIG. 3), no leakage occurs.

The electrical connectors of this invention have superior high pressure characteristics. When a pressure of 30,000 pounds per square inch is applied to the top surface 40 of the connector, it doesn't either break or crack.

The electrical connectors of this invention also have superior high vacuum properties. In a test demonstrating such properties, the connector is plugged into a helium mass spectrometer leak detector (see, e.g., pages 417 et seq. of John F. O'Hanlon's "A User's Guide to Vacuum Technology," Second Edition (John Wiley and Sons, New York, 1989). Even when subjected to a vacuum of about $10^{-11}$ Torr, the connectors exhibit no leakage in this test.

The connectors of this invention, when subjected to a temperature of 20 degrees Kelvin, exhibit neither electrical breakdown, nor leakage under high pressure, nor leakage under high vacuum. Furthermore, at a temperature of 350 degrees Centigrade, the connectors exhibit neither electrical breakdown nor leakage under high pressure nor leakage under high vacuum.

The following examples are presented to illustrated the claimed invention but are not to be deemed limitative thereof. Unless otherwise specified, all parts are by weight, and all temperatures are in degrees centigrade.

EXAMPLE 1

In accordance with the procedure described in the specification, a connector was made in which the metal case consisted of low-carbon alloy material comprised of about 0.1 percent of carbon, 0.8 percent of manganese, 0.14 percent of sulfur, 0.2 percent of silicon, 0.12 percent of phosphorous, the remainder consisting essentially of iron; the thermal expansion coefficient of this material is about $135 \times 10^{-7}$ per centimeter per centimeter per degree Centigrade.

Eight pin conductors were used, each of which consisted essentially of iron-nickel alloy comprised of less than 0.05 percent of carbon, less than 0.02 percent of phosphorous, less than 0.02 percent of sulfur, less than 0.40 percent of manganese, less than 0.3 percent of silicon, about 50 percent of nickel, with the remainder essentially consisting of iron. The coefficient of thermal expansion of this material was about $95 \times 10^{-7}$ per centimeter per centimeter per degree Centigrade.

Each of the metal parts was coated with a layer of gold which was about 1.0 micron thick.

The glass powder used in this example contained in excess of 60 weight percent of silica, and it had a coefficient of thermal expansion of $103 \times 10^{-7}$ per centimeter per centimeter per degree Centigrade.

The connector had a substantially cylindrical shape, with an outside diameter of 1.0 inch.

When a direct current voltage of 2 kilovolts was applied between pin 54 and case 52 of the connector (see FIG. 3), no leakage occurred.

When the connector was subjected to a vacuum of $10^{-11}$ Torr and tested by a helium leak detector, no leakage occurred.

When a pressure of 30,000 pounds per square inch was applied to the top surface 40 of the connector (see FIG. 2), it did not either break or crack.

EXAMPLE 2

The procedure of Example 1 was substantially repeated, with the exception that different materials were used.

A connector was made in which the metal case consisted of "KOVAR," comprised of about 54 percent of iron. 29 percent of nickel, and 17 percent of cobalt; the thermal expansion coefficient of this material is about $47 \times 10^{-7}$ per centimeter per centimeter per degree Centigrade. Fifty pin conductors were used, each of which also consisted essentially of "KOVAR."

The glass powder used in this example contained 70 percent of silica, 10 percent of potassium oxide, 2.0 percent of lithium oxide, 6.0 percent of sodium oxide, and 10 percent of barium oxide; and it had a coefficient of thermal expansion of $32 \times 10^{-7}$ per centimeter per centimeter per degree Centigrade.

The connector had a substantially cylindrical shape, with an outside diameter of 4.0 inches.

When a direct current voltage of 2 kilovolts was applied between pin 54 and case 52 of the connector (see FIG. 3), no leakage occurred.

When the connector was subjected to a vacuum of $10^{-11}$ Torr and tested by a helium leak detector, no leakage occurred.

When a pressure of 30,000 pounds per square inch was applied to the top surface 40 of the connector (see FIG. 2), it did not either break or crack.

When the connector was subjected to a temperature of 20 degrees Kelvin, no electrical breakage, vacuum breakage, or pressure breakage was observed.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A process for preparing an electrical connector, comprising the steps of:
   (a) preparing a glass plug with a top surface, a bottom surface, a side surface, and at least one orifice extending from said top surface to said bottom surface, wherein said plug is provided a process comprising the steps of:
      1. providing glass powder with a particle size such that substantially all of its particles are from about 10 to about 300 microns,
      2. mixing from about 95 to about 85 parts by weight of said glass powder with from about 5 to about 15 parts by weight of organic binder, to provide a first mixture of glass powder and binder,
      3. grinding said first mixture of glass powder and binder to provide a second mixture of glass powder and binder whose particles are from about 150 to about 425 microns in size,
      4. forming said second mixture of glass powder and binder into a green body in the shape of said glass plug with said top surface, said bottom surface, said side surface, and at least orifice extending from said top surface to said bottom surface,
      5. removing at least about 95 weight percent of said organic binder from said green body, thereby producing a debindered green body,
      6. heating said debindered green body to a temperature of from about 300 to about 1,000 degrees centigrade for at least about 10 minutes, thereby producing a free-standing glass plug;
   (b) providing a rigid, metallic outer shell adapted to surround and be contiguous with said free-standing glass plug, wherein the coefficient of thermal expansion of said rigid metallic outer shell is at least equal to the coefficient of thermal expansion of said free-standing glass plug;
   (c) providing at least one metallic pin conductor adapted to fit within said orifice of said glass plug, wherein the coefficient of thermal expansion of said free-standing glass plug is at least equal to the coefficient of thermal expansion of said metallic pin conductor;
   (d) cleaning each of said rigid metallic shell and said metallic pin conductor by a process comprising the steps of:
      1. heating each of said metal part by subjecting it to a temperature of from about 800 to about 1,300 degrees centigrade for at least about 30 minutes while blanketing said part in an environment containing at least 10 volume percent of hydrogen, and
      2. thereafter oxidizing each of said metal parts until an oxidized layer of from about 0.5 to about 3.0 microns is formed on its surfaces,
   whereby a cleaned rigid metallic shell and a cleaned metallic pin conductor are produced;
   (e) providing a rigid metallic shell—glass plug—metallic pin conductor assembly by the steps comprised of:
      1. disposing said free-standing glass plug within said cleaned rigid metallic shell, and
      2. disposing said cleaned metallic pin conductor within said orifice; and
   (f) heating said rigid metallic shell—glass plug—metallic pin conductor assembly to a temperature of from about 750 to about 1,500 degrees centigrade for at least about 5 minutes.

2. The process as recited in claim 1, wherein said rigid metallic shell has a coefficient of thermal expansion which is substantially equal to that of said glass plug.

3. The process as recited in claim 2, wherein said glass plug has a coefficient of thermal expansion which is substantially equal to that of said metallic pin conductor.

4. The process as recited in claim 1, wherein said rigid metallic shell has a coefficient of thermal expansion which is greater than that of said glass plug.

5. The process as recited in claim 4, wherein said glass plug has a coefficient of thermal expansion which is greater than that of said metallic pin conductor.

6. The process as recited in claim 1, wherein said rigid metallic shell consists essentially of titanium.

7. The process as recited in claim 6, wherein said metallic pin conductor consists essentially of titanium.

8. The process as recited in claim 1, wherein said organic binder is a wax.

9. The process as recited in claim 8, wherein said wax has a melting point of from about 50 to about 60 degrees centigrade.

10. The process as recited in claim 1 wherein, while each of said metallic parts is being heated to said temperature of from about 800 to about 1,300 degrees centigrade, it is disposed in a container consisting essentially of nickel.

11. The process as recited in claim 1, wherein, prior to the time said free-standing glass plug is disposed within said cleaned rigid metallic shell, said cleaned rigid metallic shell is placed over a graphite mold.

12. The process as recited in claim 5, wherein said rigid metallic shell consists essentially of titanium.

13. The process as recited in claim 12, wherein said metallic pin conductor consists essentially of titanium.

14. The process as recited in claim 13, wherein said organic binder is a wax.

15. The process as recited in claim 14, wherein said wax has a melting point of from about 50 to about 60 degrees centigrade.

16. The process as recited in claim 15 wherein, while each of said metallic parts is being heated to said temperature of from about 800 to about 1,300 degrees centigrade, it is disposed in a container consisting essentially of nickel.

17. The process as recited in claim 16, wherein, prior to the time said free-standing glass plug is disposed within said cleaned rigid metallic shell, said cleaned rigid metallic shell is placed over a graphite mold.

18. The process as recited in claim 1, wherein said glass plug has a substantially cylindrical cross-section.

19. The process as recited in claim 1, wherein said top surface of said glass plug has a maximum dimension which is different from said bottom surface of said glass plug.

20. The process as recited in claim 19, wherein, prior to the time said free-standing glass plug is disposed within said cleaned rigid metallic shell, said cleaned rigid metallic shell is placed over a graphite mold.

* * * * *